2,879,293

Patented Mar. 24, 1959

2,879,293

BENZYLAMINE DERIVATIVES

Moses Wolf Goldberg, Upper Montclair, and Sidney Teitel, Nutley, N.J., assignors to Hoffmann-La Roche Inc., Nutley, N.J., a corporation of New Jersey No Drawing. Application February 19, 1957
Serial No. 641,018

11 Claims. (Cl. 260—559)

This invention relates to new benzylamine derivatives. More particularly, the invention relates to 2-(dilower alkyl-amino-lower alkoxy)-N-(3,4,5-trimethoxybenzoyl)benzylamine, 4-(dilower alkyl-amino-lower alkoxy)-N-(3,4,5-trimethoxybenzoyl)benzylamine and salts thereof.

The compounds of this invention are synthesized by reacting a 2- or 4-(dilower alkyl-amino-lower alkoxy) benzylamine with a 3,4,5-trimethoxybenzoyl halide, preferably in an organic solvent such as benzene or acetonitrile at reflux temperature.

The 2-(dilower alkyl-amino-lower alkoxy)-N-(3,4,5-trimethoxybenzoyl)benzylamine and 4-(dilower alkyl-amino-lower alkoxy)-N-(3,4,5-trimethoxybenzoyl)benzylamine may be first produced in the form of an acid salt which simplifies the isolation and purification of the product. The acid salt may then be neutralized with a base, such as sodium hydroxide or ammonium hydroxide, to obtain the free amine.

The starting materials, 2-(dilower alkyl-amino-lower alkoxy)-benzylamine and 4-(dilower alkyl-amino-lower alkoxy)benzylamine, are produced by etherifying o-hydroxybenzaldehyde or p-hydroxy-benzaldehyde with the appropriate dilower alkyl-amino-lower alkyl halide at reflux temperature in an organic solvent to obtain the corresponding 2-(dilower alkyl-amino-lower alkoxy)benzaldehyde or 4-(dilower alkyl-amino-lower alkoxy)benzaldehyde. The benzaldehyde compound is then reductively aminated with ammonia, for example by hydrogenating under pressure at elevated temperature in the presence of a Raney nickel catalyst and ammoniacal alcohol solution, to obtain the 2- or 4-(dilower alkyl-amino-lower alkoxy)benzylamine.

The 2- and 4-(dilower alkyl-amino-lower alkoxy)-N-(3,4,5-trimethoxybenzoyl)benzylamines react with a variety of inorganic and organic acids to produce acid addition salts which are acceptable for pharmaceutical uses. The acid salts may be produced initially as indicated above or the free amine may be treated with the appropriate organic or inorganic acid. Acid addition salts formed by the amines include hydrohalides, such as hydrochloride, hydrobromide, hydroiodide, etc., sulfate, phosphate, nitrate, toluene sulfonate, citrate, oxalate, ascorbate, tartrate, acetate, salicylate, camphorsulfonate, and benzenesulfonate.

The compounds of this invention are useful as antiemetic agents, for example for the suppression of nausea associated with gastrointestinal disturbances, motion sickness or pregnancy, or induced by the administration of other therapeutic agents. The compounds may be administered orally or parenterally by combining therapeutic doses with conventional carriers and/or excipients, to prepare tablets or injectables according to accepted pharmaceutical practice.

The following examples are illustrative of the invention. All temperatures are in degrees centigrade.

Example 1

To 122 grams (1 mol) of p-hydroxybenzaldehyde in 1 liter of chlorobenzene were added 66 grams (1.04 mols) of sodium methoxide (85%) and 108 grams (1 mol) of 2-dimethylaminoethyl chloride. The mixture was stirred and refluxed for 15 hours, then cooled and the precipitated sodium chloride filtered off. The filtrate was concentrated at steam temperature under water vacuum, and the residual oil was fractionated in high vacuum, to give 4-(2-dimethylaminoethoxy)benzaldehyde, $b_{2.2}$ 145°, $n_D^{25}=1.5471$.

Two teaspoons of Raney nickel catalyst were added to a solution of 65.6 grams (0.34 mol) of 4-(2-dimethylaminoethoxy)benzaldehyde in 300 ml. of 10% ammoniacal ethanol. The mixture was hydrogenated at 80° and a pressure of 1,000 p.s.i. The catalyst was filtered off, the volatiles were distilled off and the residual oil was fractionated in high vacuum, to obtain 4-(2-dimethylaminoethoxy)benzylamine, $b_{0.3}$ 120–123°, $$n_D^{25}=1.5321$$

An aliquot of the amine was treated with a solution of oxalic acid in ether, giving crystalline 4-(2-dimethylaminoethoxy)benzylamine dioxalate monohydrate, M.P. 163–165° (crystallized from 60% ethanol).

To 9.7 grams (0.05 mol) of 4-(2-dimethylaminoethoxy)benzylamine, dissolved in 100 ml. of acetonitrile, was added all at once 12 grams (0.051 mol) of 3,4,5-trimethoxybenzoyl chloride, dissolved in 75 ml. of acetonitrile. The mixture was stirred and refluxed for 8 hours, and then cooled. The crystalline solid, which had formed, was filtered off, washed with acetonitrile and recrystallized from acetonitrile, to give 4-(2-dimethylaminoethoxy)-N-(3,4,5-trimethoxybenzoyl)benzylamine hydrochloride, M.P. 185–186°.

Example 2

66.3 grams (0.3 mol) of 4-(2-diethylaminoethoxy)-benzaldehyde (prepared by the method described in the first paragraph of Example 1 for the dimethylaminoethoxy analog) was reductively aminated, according to the procedure described in the second paragraph of Example 1, to obtain 4-(2-diethylaminoethoxy)benzylamine, $b_{0.3}$ 130°, $n_D^{25}=1.5220$. 11 grams (0.5 mol) of 4-(2-diethylaminoethoxy)benzylamine, dissolved in 100 ml. of dry benzene, was reacted with 12 grams (0.051 mol) of 3,4,5-trimethoxybenzoyl chloride, dissolved in 75 ml. of dry benzene. A gum formed. The mixture was stirred and refluxed for 8 hours, and then cooled. The solid, which had formed, was filtered off and crystallized from methanol-ether, to obtain 4-(2-diethylaminoethoxy)-N-(3,4,5-trimethoxybenzoyl)benzylamine hydrochloride, M.P. 172–173°.

Example 3

76 grams (0.62 mol) of p-hydroxybenzaldehyde and 73 grams (0.6 mol) of 3-dimethylaminopropyl chloride were reacted according to the procedure described in the first paragraph of Example 1 to produce 4-(3-dimethylaminopropoxy)benzaldehyde, $b_{1.1}$ 143°, $n_D^{26}=1.5415$. 66.2 grams (0.32 mol) of 4-(3-dimethylaminopropoxy)-benzaldehyde were reductively aminated with ammoniacal ethanol, according to the procedure described in Example 1, to obtain 4-(3-dimethylaminopropoxy)benzylamine, $b_{0.5}$ 124°, $n_D^{25}=1.5235$. 10.4 grams (0.05 mol) of 4-(3-dimethylaminopropoxy)benzylamine were reacted with 12 grams (0.051 mol) of 3,4,5-trimethoxybenzoyl chloride, according to the procedure described in Example 2, to obtain 4-(3-dimethylaminopropoxy)-N-(3,4,5-trimethoxybenzoyl)benzylamine hydrochloride, which was crystallized from methanol-ether, M.P. 163–165°.

Example 4

122 grams (1 mol) of salicylaldehyde and 108 grams (1 mol) of 2-dimethylaminoethyl chloride were reacted as described in the first paragraph of Example 1, to produce 2-(2-dimethylaminoethoxy)benzaldehyde, $b_{0.15}$ 100°, $n_D^{25}=1.5348$. 65.6 grams (0.34 mol) of 2-(2-dimethylaminoethoxy)benzaldehyde were reductively aminated according to the procedure described in Example 1 to obtain 2-(2-dimethylaminoethoxy)benzylamine, $b_{0.4}$ 100°, $n_D^{25}=1.5260$. 9.7 grams (0.05 mol) of 2-(2-dimethylaminoethoxy)benzylamine were reacted with 12 grams (0.051 mol) of 3,4,5-trimethoxybenzoyl chloride, according to the procedure described in Example 2, to obtain 2-(2-dimethylaminoethoxy)-N-(3,4,5-trimethoxybenzoyl)benzylamine hydrochloride hemihydrate, which was crystallized from methanol-ethanol-ether, M.P. 199–200°.

We claim:

1. A member of the group consisting of 2-(dilower alkyl-amino-lower alkoxy)-N-(3,4,5-trimethoxybenzoyl)-benzylamine, 4-(dilower alkyl-amino-lower alkoxy)-N-(3,4,5-trimethoxybenzoyl)benzylamine and acid addition salts thereof.
2. 4-(dilower alkyl-amino-lower alkoxy)-N-(3,4,5-trimethoxybenzoyl)benzylamine.
3. Acid addition salts of 4-(dilower alkyl-amino-lower alkoxy)-N-(3,4,5-trimethoxybenzoyl)benzylamine.
4. 4-(2-dimethylaminoethoxy)-N-(3,4,5-trimethoxybenzoyl)benzylamine hydrohalide.
5. 4-(2-dimethylaminoethoxy)-N-(3,4,5-trimethoxybenzoyl)benzylamine hydrochloride.
6. 4-(2-diethylaminoethoxy)-N-(3,4,5-trimethoxybenzoyl)benzylamine hydrohalide.
7. 4-(2-diethylaminoethoxy)-N-(3,4,5-trimethoxybenzoyl)benzylamine hydrochloride.
8. 2-(dilower alkyl-amino-lower alkoxy)-N-(3,4,5-trimethoxybenzoyl)benzylamine.
9. Acid addition salts of 2-(dilower alkyl-amino-lower alkoxy)-N-(3,4,5-trimethoxybenzoyl)benzylamine.
10. 2-(2-dimethylaminoethoxy)-N-(3,4,5-trimethoxybenzoyl)benzylamine hydrohalide.
11. 2-(2-dimethylaminoethoxy)-N-(3,4,5-trimethoxybenzoyl)benzylamine hydrochloride.

References Cited in the file of this patent

UNITED STATES PATENTS

| | | |
|---|---|---|
| 1,941,647 | Wolfes | Jan. 2, 1934 |
| 2,025,587 | Haller et al. | Dec. 24, 1935 |
| 2,495,772 | Rieveschl et al. | Jan. 31, 1950 |
| 2,552,241 | Weissberger et al. | May 8, 1951 |
| 2,571,325 | Zenter et al. | Oct. 16, 1951 |
| 2,608,581 | Zienty | Aug. 26, 1952 |
| 2,773,900 | Mills | Dec. 11, 1956 |

OTHER REFERENCES

Kratzl et al.: Monatshefte, vol. 83, page 20 (1952).